United States Patent
Kostrzewsky et al.

(10) Patent No.: US 6,648,336 B1
(45) Date of Patent: Nov. 18, 2003

(54) MULTI-FUNCTION SEAL ASSEMBLY FOR ROTATING SHAFTS

(75) Inventors: Gregory J. Kostrzewsky, Columbus, IN (US); Michael A. Shea, Spartanburg, SC (US); Qimin Dong, Greer, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 216 days.

(21) Appl. No.: 09/628,402

(22) Filed: Aug. 1, 2000

(51) Int. Cl.[7] .................................................. F16J 15/16
(52) U.S. Cl. ......................... 277/549; 277/553; 277/573
(58) Field of Search ................................ 277/356, 353, 277/361, 371, 402, 549, 553, 573, 910

(56) References Cited

U.S. PATENT DOCUMENTS

| | | | |
|---|---|---|---|
| 3,687,464 A | * | 8/1972 | Jackson et al. ............. 277/553 |
| 4,410,188 A | * | 10/1983 | Copes |
| 5,002,405 A | * | 3/1991 | Persson ....................... 384/469 |
| 5,024,449 A | * | 6/1991 | Otto |
| 5,238,253 A | * | 8/1993 | Sieghartner |
| 5,938,205 A | * | 8/1999 | Azibert et al. |
| 6,168,163 B1 | * | 1/2001 | Thorson et al. ............. 277/419 |
| 6,241,396 B1 | * | 6/2001 | Shimomura et al. ........ 384/477 |
| 6,250,813 B1 | * | 6/2001 | Thibault ...................... 384/495 |

* cited by examiner

Primary Examiner—Anthony Knight
Assistant Examiner—Enoch Peavey
(74) Attorney, Agent, or Firm—Patrick S. Yoder; Alexander M. Gerasimow; William R. Walbrun

(57) ABSTRACT

A seal system is provided for a bearing. The bearing includes a housing having two sides and a bearing element disposed within the housing. The bearing element is disposed to facilitate motion of a rotating shaft. The seal system includes a seal carrier which is adapted to be mounted on the bearing housing. The seal carrier has a groove in an inner periphery wherein a seal is disposed within the seal carrier groove. The seal has a soft flexible lip which contacts the rotating shaft. A groove is formed in an outer periphery of the seal for receiving a retaining device. The seal and the seal carrier are mountable on either side of the bearing even when the two sides experience dissimilar environments such as vacuum on one side and a liquid spray on the other. The seal and/or the seal carrier may be split for facilitating simpler in-field installation.

22 Claims, 5 Drawing Sheets

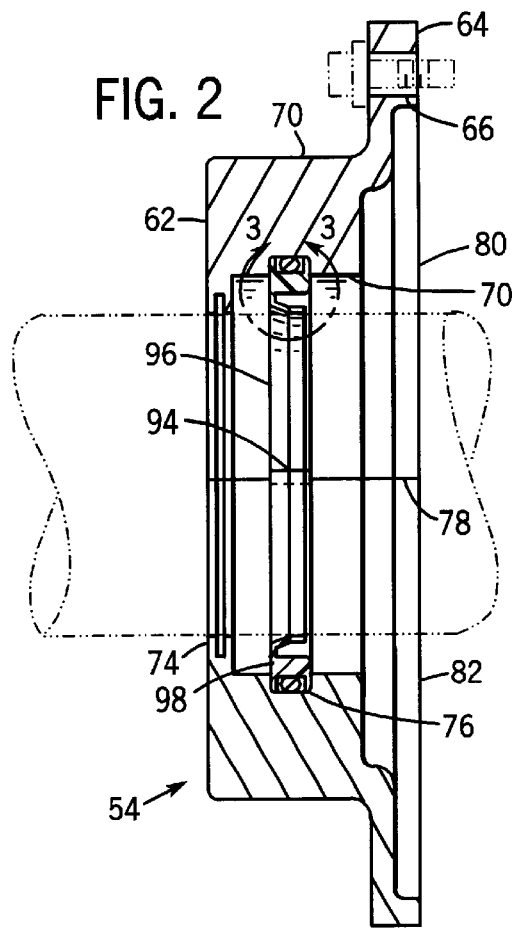
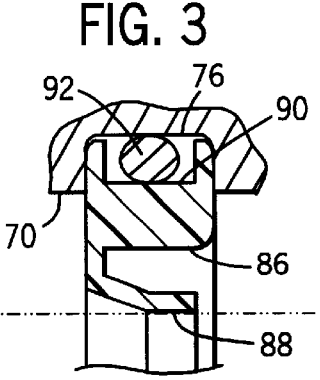
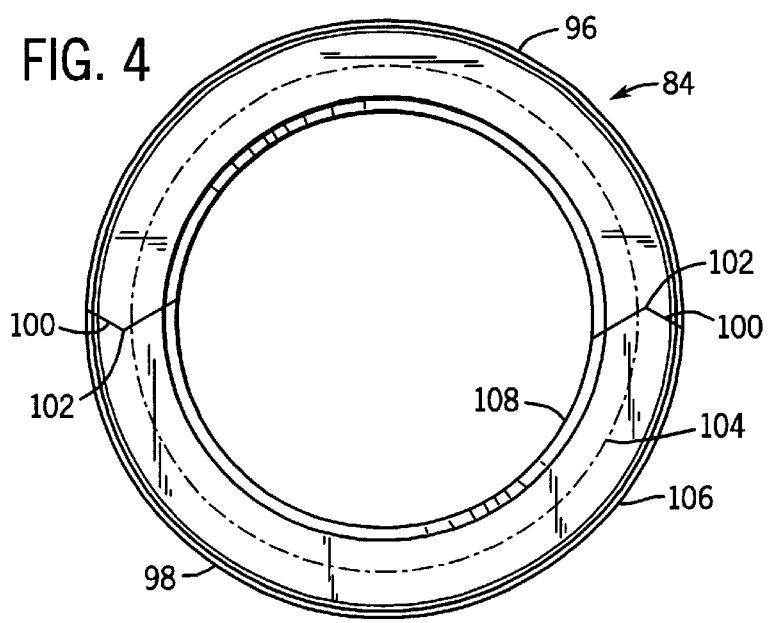

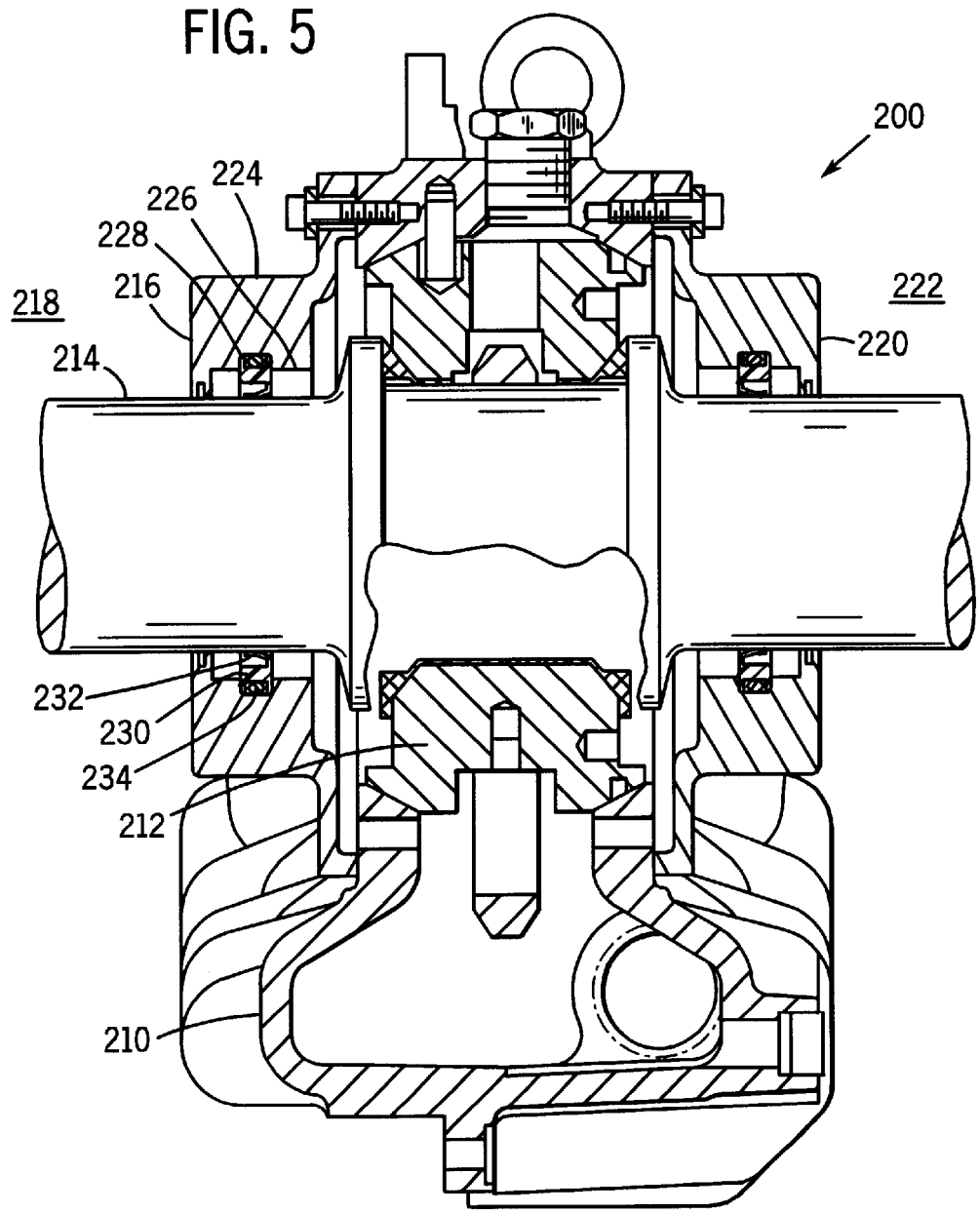

MULTI-FUNCTION SEAL ASSEMBLY FOR ROTATING SHAFTS

BACKGROUND OF THE INVENTION

1. Field of the Invention

The present invention relates generally to the field of bearings and seals for such bearings. More particularly, the invention relates to a novel arrangement for maintaining lubricant, such as oil mist, within a bearing cavity, to keep contaminants out of the bearing cavity and also for simplifying the manner in which seals are integrated into a bearing structure.

2. Description of the Related Art

A wide variety of bearings are available and are currently in use throughout a range of industrial applications. Bearings are generally used to facilitate rotational movement in a mechanical application. Some bearings, known as guide bearings, are designed to facilitate linear motion. In general, a typical bearing includes a plurality of bearing elements situated in a housing. Depending upon the application and the anticipated loading, the bearing elements may be journal bearings, needle bearings, roller bearings, ball bearings, and so forth.

A journal bearing is typically formed from a plain cylindrical sleeve that carries a rotating shaft. Journal bearings are sometimes referred to as fluid film bearings because of the presence of a small film of lubricant used between the cylindrical sleeve and the rotating shaft. The coefficient of friction between the cylindrical sleeve and the rotating shaft is partially dependent on the whether a fluid film is fully developed. In essence, a fully developed fluid film creates a hydrodynamic pressure sufficient to float the shaft and its respective load relative to the sleeve or journal. The result of a fully developed fluid film is that there is essentially no physical contact between the rotating shaft and the bearing during operation. Proper development of a fluid film is, in turn, dependent on adequate lubrication of the bearing journal.

Adequate lubrication has other related and consequential benefits in addition to proper fluid film development. For example, it is commonplace to equip a bearing with a means for lubricating the bearing elements during operation to prolong the useful life of the bearings. This is typically accomplished by providing a synthetic or mineral grease or oil to coat the surfaces of the bearing elements. The application of grease or oil serves to preclude the ingress of contaminants, such as dirt, debris, moisture, and so forth into the bearing. In some applications the application of oil is accomplished by use of an oil ring. An oil ring hangs loosely over a shaft and rotates as the shaft rotates due to the ring's contact with the shaft. Lubricant is carried from an oil sump to the shaft, then to the bearing liner. Another method is to use an oil circulating system wherein a pressurized lubricant is supplied directly to the bearing liner. In other applications, a pressurized oil mist may be circulated through a bearing cavity to provide continuous lubrication of the bearing. In addition to lubricating and cooling the bearing, each lubrication method operates to prevent the ingress of contaminants, while flushing the bearing cavity of contaminants and moisture.

One difficulty which arises in operation of typical fluid film bearings is proper isolation of the internal components of the bearing. Not only is it desirous to contain the lubricant in the bearing, it is also important to preclude contaminants, both liquid and solid, from entering the lubrication zone. This is generally accomplished through the use of an oil seal. A standard oil seal typically extends from a stationary member of the bearing assembly, such as a seal carrier or the bearing housing, to a moving surface of a shaft. The seal thus attempts to create coincidental surfaces which move relative to each other while providing a barrier against ingress of contaminants and egress of lubricants. Various oil seal designs have been employed to prevent communication between the internal components and the external environment. Much design work has been focused on the effectiveness and efficiency of such seals, particularly with respect to the manner of interaction of the seal with the shaft.

As stated previously, the purpose of a basic oil seal is to prevent contaminants from entering the internal components of the bearing while retaining the lubricants within the bearing housing. However, bearings operate in a variety of environments and quite often a standard seal does not provide adequate protection. For example, electrical machines generate a small pressure or vacuum within the motor frame due to rotation of the shaft and to air flow from an internal or external cooling fan. In such a case the vacuum tends to draw the lubricant from within the bearing housing out into the electrical machine and subsequently into the surrounding atmosphere. To combat this problem, a second seal, typically referred to as an air seal, may be disposed between the electrical machine and the oil seal. Thus the air seal serves to reduce or eliminate any effect on the pressure difference on the oil seal, while the oil seal performs its traditional service.

Still another special case arises where the bearing operates in a harsh environment. Such an environment may include fine airborne particles, liquid spray or perhaps exposure to various chemicals. It is often desirable to keep such contaminants out of the lubricant. Particles that enter into the lubricant may change the viscosity of the lubricant, or even degrade the lubricant itself, resulting in substandard performance and premature wear of the bearing. Introduction of certain chemicals into the lubrication system might wash away or degrade the fluid film causing a similar result. When a bearing is exposed to such an environment a secondary seal may be placed outside of the oil seal to provide greater protection. By way of example, a water baffle is sometimes placed on the exterior of a bearing housing to prevent fluids such as water from entering into the oil seal area.

Another difficulty with standard bearing oil seals is that when they fail, and thus require replacement, disassembly of the bearing and removal from the shaft is necessary to place the new seal in its proper location. The continuity of the seal (i.e. an annular member) is often desired to reduce the number of passages for ingress and egress to and from the internal components. Thus, with a continuous seal forming a ring, the seal must be slid over the end of the shaft before being placed in its proper position in the seal carrier or bearing housing.

There is a need, therefore, for an improved technique for sealing bearings which is effective at maintaining lubricant within the environment of the bearing, while also inhibiting the ingress of contamination and moisture into the vicinity of the bearing. There is also a particular need for a sealing technique for bearings which allows a single seal to operate in diverse environments thus replacing the use of multiple seals. In particular, there is a need for a sealing technique for bearings that can be both installed on new motors and other rotating equipment, as well as retrofitted to existing applications to obviate or reduce the need for multiple seal designs.

SUMMARY OF THE INVENTION

The invention provides a sealing technique designed to respond to these needs. In accordance with a first aspect of the technique, a seal system is provided for a bearing. The bearing includes a housing having two sides. The bearing also includes a bearing element disposed within the housing for facilitating motion of a rotating shaft. The seal system includes a seal carrier which may be integral with the housing or adapted to be mounted on the housing. The seal carrier has a groove in an inner periphery wherein a seal is disposed within the seal carrier groove. The seal has a soft flexible lip which contacts the rotating shaft. A groove is formed in an outer periphery of the seal for receiving a retaining device. The seal and the seal carrier are mountable on either side of the bearing even when the two sides experience dissimilar environments such as vacuum on one side and a liquid spray on the other. The technique also provides for splitting the seal and/or the seal carrier.

In accordance with another aspect of the technique, an alternative seal system for a bearing is provided. The bearing includes a housing having two sides. The bearing also includes a bearing element disposed within the housing for facilitating motion of a rotating shaft. The sealing system includes a first and a second seal carrier each housing an independent seal. The first seal carrier is mounted on the first side of the bearing with the first seal housed within the first seal carrier. The second seal carrier is mounted on the second side of the bearing with a second seal being housed within the second seal carrier. The first seal carrier and second seal carrier are substantially identical. Likewise, the first seal and second seal are substantially identical. While the seals are substantially identical, the first and second side of the bearing may be exposed to dissimilar environments. Again, the seals and/or the seal carriers may be split to facilitate installation and maintenance.

In accordance with yet another aspect of the technique a bearing is provided for facilitating movement of a rotating shaft. The bearing includes a housing having two sides. The bearing also includes a bearing element disposed within the housing for facilitating motion of a rotating shaft. The first side of the bearing includes a first seal carrier mounted to it with a first seal housed within the first seal carrier. The second side of the bearing includes a second seal carrier mounted on it with a second seal being housed within the second seal carrier. The first seal carrier and second seal carrier are substantially identical. Likewise, the first seal and second seal are substantially identical. The first and second side of the bearing may be exposed to dissimilar environments.

In accordance with a further aspect of the technique, a seal kit for a bearing is provided. The bearing includes a housing having a first and a second side. A bearing element is disposed within the housing for facilitating motion of a rotating shaft. The seal kit includes a seal having a soft flexible lip in contact with the rotating shaft. The seal also has a groove in an outer periphery of the seal for receiving a retaining member. At least one split may be formed in the seal, the split defining a pair of opposing and mating ends.

BRIEF DESCRIPTION OF THE DRAWINGS

The foregoing and other advantages of the invention will become apparent upon reading the following detailed description and upon reference to the drawings in which:

FIG. 2 illustrates a sectional view of a seal carrier and seal according to one embodiment of the present technique;

FIG. 3 illustrates an enlarged sectional view of a portion of the seal and seal carrier shown in FIG. 2;

FIG. 4 illustrates an elevational view of the seal according to an embodiment of the present technique;

FIG. 5 illustrates a sectional view of a bearing and seal arrangement according to another embodiment of the technique;

DETAILED DESCRIPTION OF SPECIFIC EMBODIMENTS

Figure 1:
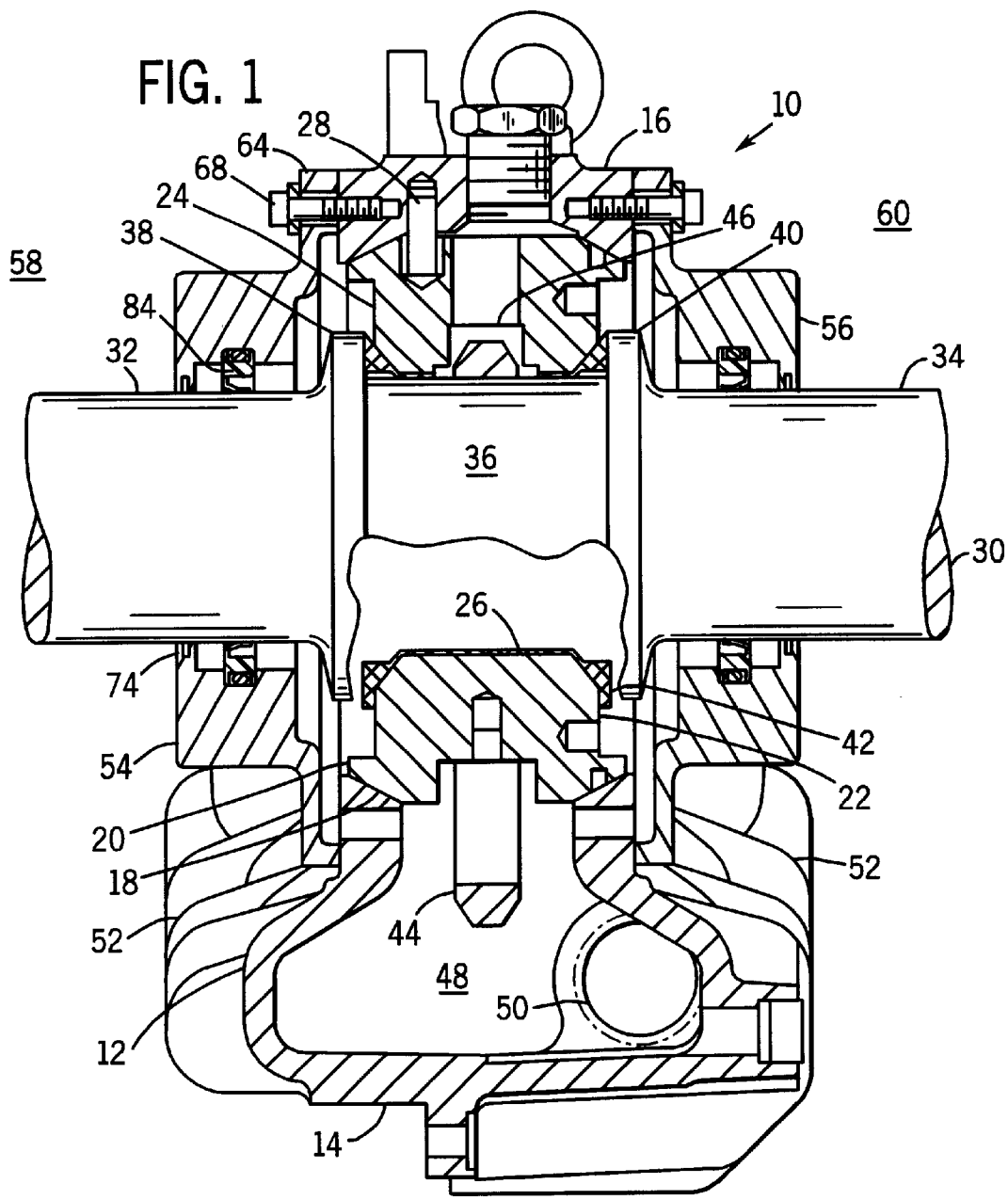
FIG. 1 illustrates a sectional view of a bearing and seal arrangement according to an exemplary embodiment of the present technique.

Turning now to the drawings and referring first to FIG. 1, a bearing assembly 10 is shown. The bearing assembly 10 includes a bearing housing 12 which is formed from a base 14 and a cap 16. The cap 16 is coupled to the base 14 to house various internal components. The housing 12 also includes a spherical seat support 18 adapted for receiving a bearing element 20. In the illustrated embodiment, the bearing element is formed of a lower bearing liner 22 and an upper bearing liner 24, which are mating and cooperating components. The inner surfaces of the bearing liners 22 and 24 are coated with a babbitt lining 26 in a manner known to those skilled in the art. The bearing element 20 is fixed relative to the housing 12 via an anti-rotation pin 28.

The bearing assembly 10 is depicted as a fluid film bearing, but is contemplated as being a bearing of any type for facilitating motion of a rotating shaft. Also, while a particular style of housing is depicted, numerous bearing housings are within the scope of this disclosure. For example, any housing that conforms to ISO standards 11687-1, 11687-2, or 11687-3 are capable of being adapted for sealing via the present technique.

A shaft 30 is received by the bearing element 20 and traverses the bearing housing 12. The shaft 30 is defined as having an inboard side 32, an outboard side 34 and center portion forming a bearing journal 36. Flanking the bearing journal 36 are a pair of thrust collars defined as the inboard thrust collar 38 and the outboard thrust collar 40. Each collar abuts a babbitt lined thrust shoulder 42 located on the bearing element. The thrust collars 38 and 40 work in conjunction with the thrust shoulder 42 to restrict the transverse or lateral (i.e. axial) movement of the shaft 30 within the bearing. It should be noted that not all bearings are assigned for resisting significant thrust loads, and that non-thrust bearings are also contemplated as being suitable for use with the present technique.

An oil ring 44 loosely surrounds the bearing journal 36 and is shown to be hanging from the top side of the shaft 30 adjacent a small void 46 in the inner surface of the upper bearing liner 24. The oil ring 44 also encircles the lower bearing liner 22 and the lower portion of the oil ring is exposed to an oil sump 48 located beneath the shaft 30 and bearing element 20. The oil ring 44 maintains loose contact with the shaft 30 and rotational motion of the shaft induces motion of the oil ring 44. As the oil ring 44 rotates, it travels through the oil sump 48 which contains a bath of oil or other lubricant. A small portion of the lubricant from the oil sump 48 adheres to the oil ring 44 and travels with the oil ring until it contacts the top portion of the shaft 30. The lubricant then spreads on the bearing journal 36 and works its way between the bearing journal 36 and the babbitt lining 26. The lubricant forms a thin film (not shown) between the bearing journal 36 and the babbitt lining 26. With a properly formed fluid film, the shaft 30 rotates without actually contacting the babbitt lining 26 on the bearing element 20.

It should be noted that the present technique may be used with other lubrication methods in addition to or in place of the method described above. By way of example, the sealing arrangement may be employed with bearings in which oil is circulated, such as under the influence of an oil circulation pump which may, in addition, filter and cool the lubricating oil. Additional methods of lubrication may include oil mist, and similar techniques. Moreover, the technique may be used on other bearing types, including bearings employing other mechanisms for distributing lubrication, that is, without the oil ring described above.

Part of the lubrication system may include a temperature gauge or heat exchanger (neither shown) which would be adapted for coupling to a port 50 adjacent the oil sump 48. The temperature gauge and/or heat exchanger would be utilized to monitor and control the temperature of the bath in the oil sump. Lubricants typically operate best within certain temperature ranges, and operation outside a recommended range may result in viscosity breakdown and subsequent degradation of the fluid film. Thus, proper control of the lubricant and its environment may be an issue in certain applications. Another component which aids in controlling the temperature of the lubricant are cooling fins 52 integrated into the bearing housing 12. Cooling fins take advantage of natural heat transfer principles to lower the temperature of the lubricant found in the oil sump by transferring heat into the surrounding atmosphere.

A first seal assembly, designated as the inboard seal assembly 54, is mounted to the bearing housing 12 and is exposed to an inboard environment 58. A second seal assembly, the outboard seal assembly 56, is also mounted to the bearing housing 12 opposite the inboard seal assembly 54 and is exposed to outboard environment 60. The inboard seal assembly and outboard seal assembly are substantially identical with respect to their component parts as shall be discussed below, but may be of different sizes, where appropriate. For sake of convenience, like parts of the inboard seal assembly and the outboard seal assembly have like reference numerals. In discussing the seal assemblies, primary reference will be made to the inboard assembly and FIGS. 1 and 2 are to be utilized in conjunction with such discussion. Also, for purposes of discussion, the inboard environment 58 is contemplated to be the interior of a motor enclosure adjacent a cooling fan (not shown) while the outboard environment is contemplated as a direct or indirect liquid spray. This combination of environments should not be construed as being limiting. However, the unique ability, in accordance with the present technique, to use similar sealing structures in such varied environments present significant advantages over existing bearing seal designs.

The inboard seal assembly 54 includes a seal carrier 62. The seal carrier 62 is constructed with a mounting flange 64 having a plurality of mounting holes 66 therein to receive mounting fasteners 68. Adjacent to the mounting flange 64 is the body portion 70 of the carrier 62. The carrier body 70 has an annular bore 72 through its center section for accommodating passage of the shaft 30 therethrough. At the outer edge of the carrier body 70, and adjacent the annular bore 72, is an integrated baffle 74. The baffle 74 extends to within close proximity to the circumference of the shaft 30. An interior annular groove 76 is formed in the annular bore 72. The seal carrier 62 is shown in FIG. 2 as having a split 78 which defines an upper carrier half 80 and a lower carrier half 82. The two halves 80 and 82 are mating components which, when properly mounted on the bearing housing 12, fit together to encircle the shaft 30 in a virtually continuous manner. Preferably, the two halves 80 and 82 are symmetrical. Where desired, and appropriate, the seal carrier or similar component may be provided without the split mentioned above.

Referring to FIGS. 1, 2 and 3, a seal 84 is disposed within the interior annular groove 76 of the seal carrier 62. The seal 84 includes a main body portion 86 connected to lip 88. The lip 88 defines an inner periphery of the seal 84. The lip 88 is adapted to maintain continuous contact with the surface of the rotating shaft 30 without creating undue loading on the shaft. A groove or a channel 90 is formed in the outer periphery of the seal body 86. The channel 90 accommodates a retaining device 92. The retaining device 92 serves to maintain slight amount of inward radial pressure on the seal body 86 and lip 88. The retaining device 92 may be any number of devices including a garter spring or an o-ring. If an o-ring is used, it may also serve as a secondary seal in the annular groove 76 of the retainer bore 72.

The seal 84 is formed of a soft pliable material which is relatively inert in the environments to which it may be exposed, such as polytetrafluoroethylene. As seen in FIG. 4, the seal 84 is formed as a substantially annular member. FIGS. 2 and 4 show that the seal is split at reference numeral 94. The seal 84 is thus formed of an upper section 96 and a lower section 98 which are mating components. FIG. 4 also shows that the cuts used to split the seal 84 may be V-shaped, as indicated at reference numeral 100. Furthermore, the apex 102 of the "V" is offset with respect to an annular reference line 104 as defined by half the distance between the outer radius 106 and the inner radius 108 of the seal 84. The v-shaped split 100 and the offset apex 102 are to facilitate installment of the seal sections 96 and 98. By configuring the split in such a manner the upper section of the seal 96 may not be reversed relative to the bottom section of the seal 98 during installation. The reversal of one section relative to the other would create a discontinuity at the mating ends. Reversal would also cause the lip of the upper section 96 and the lip of the lower section 98 to be facing in opposite directions. The disclosed configuration also aids the installer in keeping one seal 84 as a complete unit rather than intermixing upper and lower sections of multiple seals.

It should be noted that various alternative structures may be used in accordance with the present technique to provide the sealing function described above. By way of example, a seal may be provided which is different in configuration than the V-shaped seal described, including generally flat seals. Moreover, seals may be provided which are generally arcuate or circular in configuration. Similarly, where a V-shaped split is provided in the seal, the split may be centered on the seal, rather than offset as described above.

The seal assemblies 54 and 56 disclosed in FIGS. 1 through 4 may thus be installed or removed without the need to disassemble the entire bearing 10 or remove the shaft 30. In a typical seal arrangement the seal and seal carrier are each formed as continuous components. Thus installation and removal of these components required that they be slid over the end of the shaft. This requires disassembly of the bearing and removal of the shaft from the bearing. In the presently disclosed embodiment, the seal carrier 62 is split into two mating parts 80 and 82. Thus, each half of the carrier is independently installed and removed from the bearing housing 12. Likewise, the seal 84 is split into two sections 96 and 98. Thus, the seal also may be installed onto an assembled bearing and shaft configuration.

The retaining member 92 is a component which lends itself to re-use and therefore does not necessarily include a split. For example, a continuous garder spring or o-ring may be initially installed in the disclosed bearing assembly 10. At a later time when replacement of the seal 84 is required, the seal carrier 62 will be removed, the retaining device will be removed from the used and worn seal. The retaining device 92 is temporarily left on the shaft 30. A new seal will be placed around the shaft 30 and the retaining device 92 will be placed in the groove 90 of the new seal. The seal will be properly fit into the seal carrier groove 76 and the seal carrier 62 mounted back to the bearing housing 12.

It is noted that, where desired, the retaining device 92 may be a split component which is capable of being formed into a continuous member able to withstand a predetermined amount of tension. For example, the retaining device 92 may be formed of a coiled spring having two ends. The first end of the spring may be formed so that it has an outer diameter which is smaller than the rest of the spring. The first end may then be fitted, such as by threading the smaller first end into the larger second end, so that a structural connection is formed. Another arrangement may include a crimped joint or snap joint in an o-ring or spring where crimping or snapping to close the ring would take place at the time of installation. Similar rings may employ hooks or similar securement devices.

It is also noted that, in the disclosed embodiment, substantially identical seal assemblies 54 and 56 are exposed to dissimilar environments 58 and 60. The inboard environment 58 is subjecting the bearing 10 to a vacuum source due to its proximity to a cooling fan or other device (not shown). The vacuum tends to draw lubricant from within the interior of the bearing assembly 10. The inboard seal assembly blocks the interior of the bearing assembly from the vacuum source and prevents the loss of lubrication. The outboard environment 60, on the other hand, in the disclosed embodiment exposes the bearing to a sprayed liquid. The spray attempts to enter into the interior of the bearing and either wash away, or contaminate the lubrication. The outboard seal assembly 56 prevents such entrance and again protects the bearing element 20 and lubricant. In heretofore known seal arrangements, separate and considerably different seal assemblies were required to combat the effects of dissimilar environments leading to additional costs, stocking requirements, and so forth. Again, the seal assemblies disclosed herein are considered to be effective in numerous environments and not limited to the illustrative environments discussed above. Such other environments may include, but are not limited to, pressure differentials, chemical exposure, or airborne particulates.

While the seal assemblies 54 and 56 have been described as being substantially identical, certain features may vary between the two. While not depicted as such in FIG. 1, it may be the case that the diameter of the inboard portion of the shaft 32 will differ from the diameter of the outboard portion of the shaft 34. This is typically due to the design requirements associated with the particular application in which the shaft 30 is operating. Because these two diameters may be different, the diameters of the seal assemblies 54 and 56 will differ accordingly. This will typically include the diameter of the seal 84 itself and the integrated baffle 74. It may also include the diameter of the bore 72 with its associated annular groove 76 and other features of the seal carrier 62. However, the overall construction of the seal assemblies 54 and 56 remains substantially identical, regardless of any differences in inboard and outboard shaft diameters.

Turning to FIG. 5, an alternative embodiment is disclosed. A bearing assembly 200 is depicted with general features similar those discussed above. The bearing assembly includes a housing 210 which contains a bearing element 212 disposed to receive and facilitate rotation of a shaft 214. A first seal assembly, which shall be referred to as the inboard seal assembly 216 is mounted to the housing 210 and exposed to an inboard environment 218. A second seal assembly, which shall be referred to as the outboard seal assembly 220, is mounted to the housing 210 opposite of the inboard assembly 216 and is exposed to an outboard environment 222. The two seal assemblies 216 and 220 are substantially identical to one another. It is contemplated that the inboard environment 218 is different from that of the outboard environment 222, but this need not be so. The environments 218 and 222 may be any number of environments that a bearing is typically exposed to such as a vacuum or pressure source, direct or indirect liquid spray, chemical exposure, or dust or other airborne particulates.

Each seal assembly 216 and 220 includes a seal carrier 224. The seal carrier 224 is mounted to the housing 210 and is constructed with a central bore 226 through which the shaft 214 passes. Within the central bore 226 an annular groove 228 is formed, similar to that shown in FIGS. 2 and 3 and disclosed in the previous embodiment. A lip seal 230 is disposed within the annular groove 228. The lip seal 230 is similar to that disclosed in the previous embodiment and includes, among other features, a lip 232 in constant contact with the rotating shaft 214, and a retaining device 234 disposed in an outer circumferential groove or channel formed in the seal. The primary difference between the present embodiment and that which was disclosed above, is that the seals 230 are arranged so that the lip 232 is extends outward from the bearing element 212 rather than inward. All other features are considered similar to the embodiment disclosed above.

While not necessary, it is believed that in certain environments, reversing the seals 230 and changing the orientation of the lip 232 may yield added benefit in sealing performance. For example, seal performance may be enhanced by reversing directions of the seal if the bearing is experiencing a positive pressure rather than a vacuum.

Figure 6:
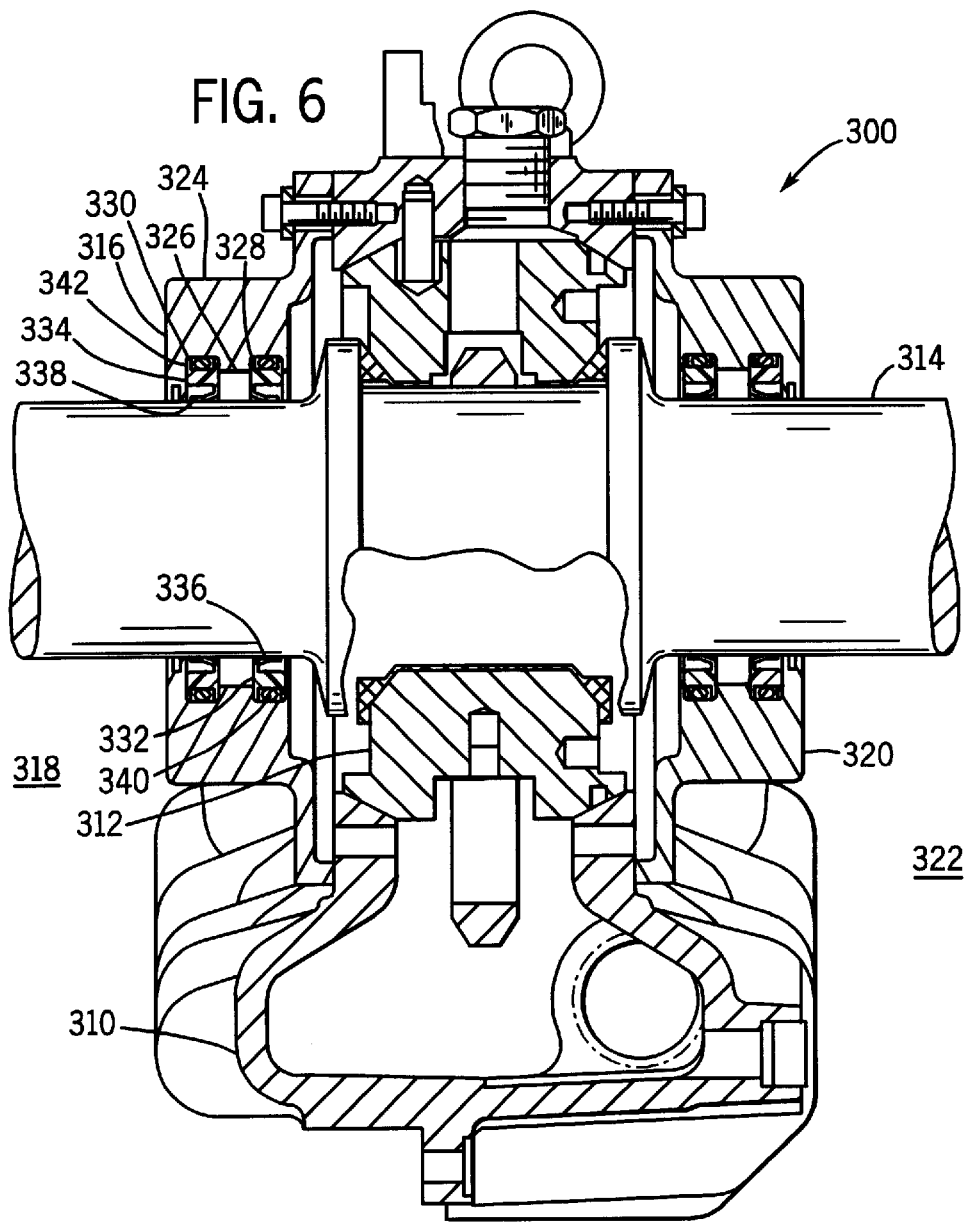
FIG. 6 illustrates a sectional view of a bearing and seal arrangement according to an alternative embodiment of the technique.

Turning now to FIG. 6, another embodiment is disclosed. A bearing assembly 300 is depicted with general features similar those discussed above. The bearing assembly includes a housing 310 which contains a bearing element 312 disposed to receive and facilitate rotation of a shaft 314. A first seal assembly, which shall be referred to as the inboard seal assembly 316 is mounted to the housing 310 and exposed to an inboard environment 318. A second seal assembly, which shall be referred to as the outboard seal assembly 320, is mounted to the housing 310 opposite of the inboard assembly 316 and is exposed to an outboard environment 322. The two seal assemblies 316 and 320 are substantially identical to each other. It is contemplated that the inboard environment 318 is different from that of the outboard environment 322, but this need not be so. The environments 318 and 322. may be any number of environments that a bearing is typically exposed to such as a vacuum or pressure source, direct or indirect liquid spray, chemical exposure, or dust or other airborne particulates.

Each seal assembly 316 and 320 includes a seal carrier 324. The seal carrier 324 is mounted to the housing 310 and is constructed with a central bore 326 through which the shaft 314 passes. Within the central bore 326 dual annular groove 328 and 330 are formed parallel to each other. The grooves 328 and 330 are similar to those shown in FIGS. 2 and 3 and disclosed 1id in the previous embodiment. Lip seals 332 and 334 are disposed within the annular grooves 328 and 330 respectively. The seals 332 and 334 are similar to those disclosed in the previous embodiment, each seal including, among other features, a lip 336 and 338 in constant contact with the rotating shaft 314, and a retaining device 340 and 342 disposed in an outer circumferential groove. The seal 332 closest to the bearing element 312 is arranged so that the lip 336 extends toward the bearing element. The seal 334 farthest from the bearing element 312 is arranged so that the lip 338 extends away from the bearing element.

In operation, the embodiment shown in FIG. 6 is a dual seal arrangement where, in a given seal assembly, one seal acts as a primary seal and the other acts as a secondary seal. Which of the two seals 332 or 334 is primary or secondary will generally depend upon the environment it was being exposed to.

Figure 7:
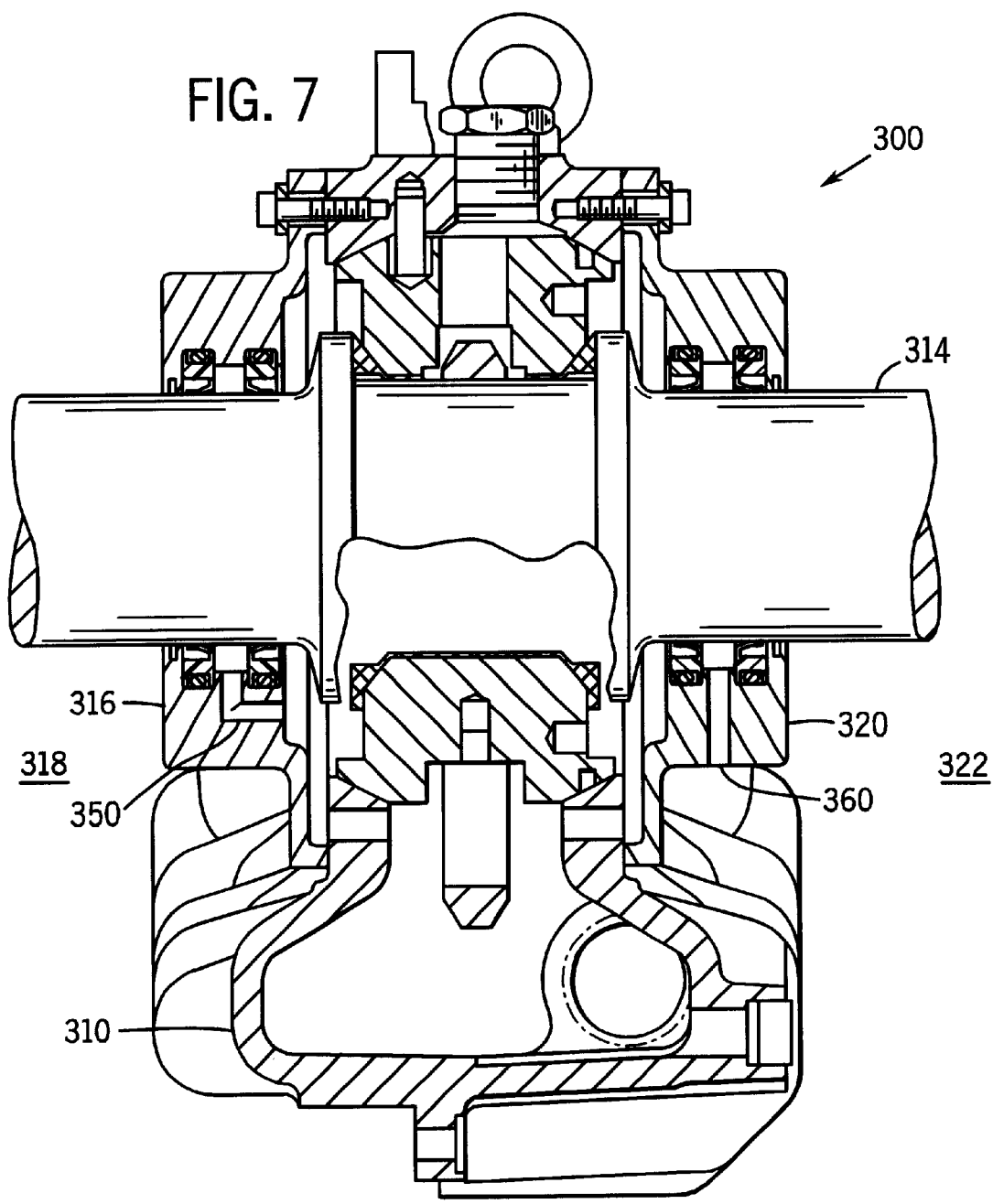
FIG. 7 illustrates a sectional view of a bearing and seal arrangement according to yet another embodiment of the technique.

FIG. 7 discloses the embodiment shown in FIG. 6, with two additional features. In the inboard seal assembly 316 and passageway 350 is formed in the seal carrier 324. The passageway 350 acts essentially as a return line. Any lubricant that escapes the interior portion of the bearing, and thus escapes the first seal 332, is returned through the passageway 350 back to the interior of the bearing.

In the embodiment shown, the outboard seal assembly 320 also contains a passageway 360 formed in the seal carrier 324. However, in this instance, the passageway does not return to the interior bearing compartment. Instead, the passageway opens to the atmosphere creating a vent between the two seals 332 and 334. This will allow the seal assembly to better accommodate pressure differentials between the environment and the interior of the bearing and release drain or expel contaminants that may get past seal 334. It should be noted that for certain applications a fitting may be provided at passage way 360 to provide additional protection.

Of course the arrangement of these features, as disclosed in FIG. 7, is illustrative, and they may be implemented in various combinations or alternative arrangements. Thus, dual return lines or dual vent lines may be desirable. It is also possible that only one of the seal assemblies will employ such a passageway.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A bearing for facilitating movement of a rotating shaft comprising:
   a housing having a first side and a second side;
   a bearing element disposed within the housing and adapted to receive the rotating shaft;
   a first seal assembly, including a first seal carrier coupled to the first side of the bearing and a first seal removably disposed within the first seal carrier; and
   a second seal assembly, including a second seal carrier coupled to the second side of the bearing and a second seal removably disposed within the second seal carrier, wherein the first and second seal assemblies are removably secured to the housing, the first and second seal carriers being radially split into a plurality of mating elements for mating engagement around the rotating shaft and the first and second seals being radially split into a plurality of mating elements for mating engagement around the rotating shaft.

2. The bearing of claim 1, wherein the first side of the bearing and the second side of the bearing are adapted to maintain sealing engagement when exposed to respective dissimilar environments.

3. The bearing of claim 1, wherein either the first side or the second side is exposed to a vacuum source and the seal assembly on the corresponding side is adapted to prevent egress of lubricant from the housing.

4. The bearing of claim 1, wherein either the first side or the second side is exposed to a pressure source and the seal assembly of the corresponding side is adapted to prevent ingress of contaminants into the housing.

5. The bearing of claim 1, wherein either the first side or the second side is adapted to maintain seal integrity when exposed to a liquid spray.

6. The bearing of claim 1, wherein the first and second seals each include a split in the seal, wherein a pair of opposing and mating ends is formed by the split.

7. The bearing of claim 1, wherein the first and second seals each comprise a soft flexible lip adapted to contact the rotating shaft.

8. The bearing of claim 7, wherein the first and second seals each further comprise a groove around an outer periphery of the seal and a retaining member disposed within the groove.

9. The bearing of claim 1, wherein each of the plurality of mating elements are independently disposed on the housing in such a manner that each of the plurality of mating elements is adapted to encircle the rotating shaft.

10. A seal system for a bearing, the bearing comprising a housing having a first and a second side and a bearing element disposed within the housing for facilitating motion of a rotating shaft, the seal system comprising:
    a removable seal carrier adapted to be mounted on the bearing housing, the seal carrier having a groove in an inner periphery thereof;
    a directional seal disposed within the seal carrier groove, the directional seal having a soft flexible lip adapted to contact the rotating shaft, a groove formed in an outer periphery thereof, and a retaining device disposed in the groove; and
    wherein the seal and the seal carrier are mountable interchangeably on either the first or the second side of the bearing and wherein the directional seal is disposable in the seal carrier groove in opposite directions.

11. The seal system of claim 10, wherein the first side and the second side of the bearing housing are adapted to maintain sealing engagement when exposed to respective dissimilar environments.

12. The seal system of claim 10, wherein the seal includes a split defining a pair of opposing and mating ends.

13. The seal system of claim 10, wherein the seal carrier is split into a pair of mating elements and wherein the mating elements are independently disposed on the housing in such a manner that the pair of mating elements are adapted to encircle the rotating shaft.

14. A seal system for a bearing, the bearing comprising a housing having a first and a second side and a bearing element disposed within the housing for facilitating motion of a rotating shaft, the seal system comprising:

a first seal assembly including a first seal carrier disposed on the first side of the bearing and a first seal disposed therein;

a second seal assembly including a second seal carrier disposed on the second side of the bearing and a second seal disposed therein, and wherein the first and second seal carriers are removably secured to the housing for removal from the housing without disassembly of the bearing element from the rotating shaft, the first and second seals being radially split into a pair of mating elements.

15. The seal system of claim 14, wherein either the first seal carrier or the second seal carrier is exposed to a vacuum source and the seal assembly on the corresponding side prevents egress of lubricant from the housing.

16. The seal system of claim 14, wherein either the first seal carrier or the second seal carrier is exposed to a vacuum source and the seal assembly on the corresponding side is adapted to prevent egress of lubricant from the housing.

17. The seal system of claim 14, wherein either the first seal carrier or the second seal carrier is exposed to a pressure source and the seal assembly on the corresponding side is adapted to prevent ingress of contaminants into the housing.

18. The seal system of claim 14, wherein either the first seal carrier or the second seal carrier is adapted to be exposed to a liquid spray.

19. The seal system of claim 14, wherein the first and second seals each contain a split in the seal wherein a pair of opposing and mating ends is formed by the split.

20. The seal system of claim 14, wherein the first and second seals each comprise a soft flexible lip in contact with the rotating shaft.

21. The seal system of claim 20, wherein the first and second seals each further comprise a groove in an outer periphery of the seal and a retaining member disposed within the seal.

22. The seal system of claim 14, wherein the mating elements are independently disposed on the hosing in such a manner that each pair of mating elements encircles the rotating shaft.

* * * * *